United States Patent [19]

Panizza et al.

[11] Patent Number: 4,640,557
[45] Date of Patent: Feb. 3, 1987

[54] ANTI-SKID DEVICE FOR MOTOR VEHICLES

[75] Inventors: Ettore Panizza; Ercole Premoli, both of Turin, Italy

[73] Assignee: Fiat Auto S.p.A., Italy

[21] Appl. No.: 744,455

[22] Filed: Jun. 13, 1985

[30] Foreign Application Priority Data

Jun. 15, 1984 [IT] Italy .................. 67621 A/84

[51] Int. Cl.$^4$ .............................................. B60T 8/58
[52] U.S. Cl. .................... 303/100; 303/111; 303/96
[58] Field of Search ............ 303/96, 100, 110, 111; 188/181 R, 181 A, 181 C

[56] References Cited

U.S. PATENT DOCUMENTS 4,418,966  12/1983  Hattwig .................. 303/100

FOREIGN PATENT DOCUMENTS 1383553  2/1975  United Kingdom ........ 303/100
1500058  2/1978  United Kingdom ........ 303/100

Primary Examiner—Bruce H. Stoner, Jr.
Assistant Examiner—Alvin Oberley
Attorney, Agent, or Firm—Sughrue, Mion, Zinn, Macpeak, and Seas

[57] ABSTRACT

The anti-skid device is intended for use on a front-wheel drive vehicle having a braking system consisting of a master cylinder connected to a first and a second hydraulic circuit each connected to the operating cylinders of the brakes of a respective pair of diagonally opposed wheels, of the motor vehicle. The device comprises:

a braking sensor,
a sensor of the average speed of the front wheels of the motor vehicle,
a sensor of the speed of rotation of at least one rear wheel of the motor vehicle,
a sensor of the steering angle of the wheels,
two electrically controlled changeover valves inserted in the first and the second hydraulic circuit respectively, and which can, upon receiving a command signal, allow at least partial reduction of the braking force of the respective wheels to which they are connected, and
an electronic control and command unit which controls the operation of said valves in dependence upon the signals supplied by said sensors.

4 Claims, 1 Drawing Figure

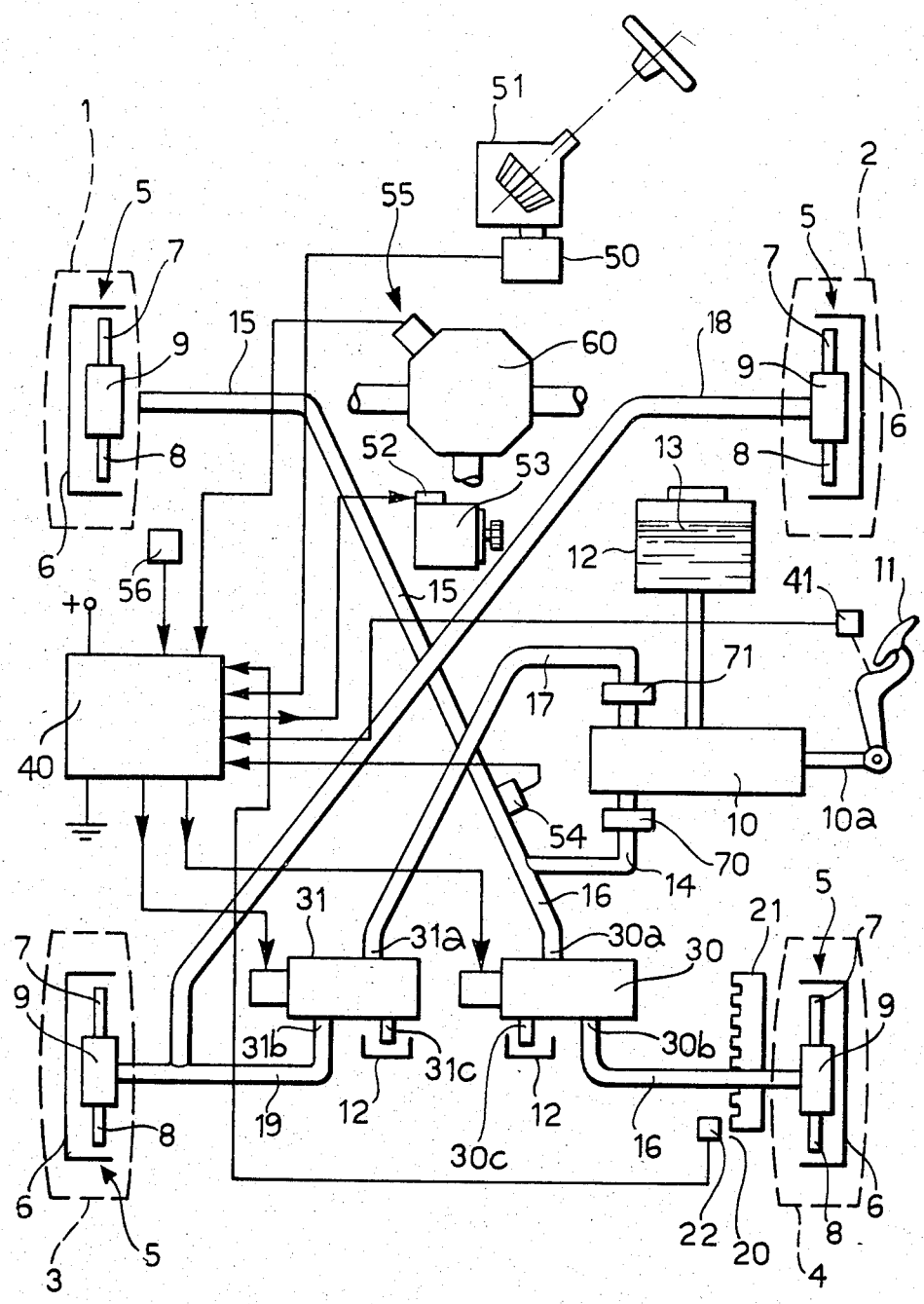

ANTI-SKID DEVICE FOR MOTOR VEHICLES

The present invention relates to an anti-skid device for a front-wheel drive motor-vehicle with a front-mounted engine and fitted with a hydraulic braking system comprising a master cylinder connected to a first and a second hydraulic circuit each of which is connected to the operating cylinders of the brakes of a respective pair of diagonally opposed wheels of the motor vehicle (X braking circuit). The object of the invention is to provide an anti-skid device of a simplified kind compared to conventional devices, which is therefore simpler and more economical to manufacture but which has nevertheless a high degree of reliability and efficiency.

This object is achieved according to the invention by a device of the aforesaid kind, the main characteristic of which is that it comprises, in combination electrical position sensor means associated with the brake pedal, sensor means of the average speed of the front wheels of the motor vehicle, angular speed sensor means designed to supply electrical signals indicative of the speed of rotation of at least one rear wheel of the motor vehicle, sensor means of the speed of rotation of the engine, an electrical sensor of the steering angle of the vehicle wheels, a first and a second electrically-controlled changeover valve, designed to be fitted respectively in the first and the second hydraulic circuit, between the master cylinder and the brake operating cylinders of a rear wheel and, respectively, a diagonally opposite wheel, each changeover valve being designed, when it receives a command signal, to changeover from a first state in which it allows braking of the wheel/wheels with which it is respectivey associated to a second position in which it causes at least partial reduction of the braking force of the wheel/wheels with which it is associated, and an electronic control and command unit connected to the said speed sensor means, to the position sensor means, to the said electrically controlled changeover valves and to the said steering sensor and arranged:

(a) to supply a command signal to the first changeover valve to reduce the braking force of the rear wheel associated with the said valve when the signals supplied by the said speed and position sensors indicate that the brake pedal is depressed and that the said rear wheel of the motor vehicle is on the point of locking;

(b) to supply a command signal to the second changeover valve to reduce the braking force of the wheels associated with the said valve when, during braking, the signals supplied by the said speed and steering sensor means indicate that at least one front wheel is locked and that the steering angle has increased beyond a predetermined extent relative to the value assumed by the said angle at the instant when the said rear wheel locked.

BRIEF DESCRIPTION OF THE DRAWING

Further characteristics and advantages of the anti-skid device according to the invention will become evident from the following detailed description, made with reference to the accompanying drawing, which is supplied purely by way of non-limiting example.

The drawing shows a hydraulic braking system of a motor vehicle having two front wheels 1, 2 and two rear wheels 3, 4. This system comprises, for each wheel, a drum brake, indicated generally 5, comprising, as known per se, a drum 6, two brake shoes 7, 8 and an operating cylinder 9.

The braking system illustrated further includes a master cylinder 10, the piston 10a of which is mechanically coupled to the brake pedal 11.

Reference numeral 12 indicates a supply reservoir containing a hydraulic fluid (13). This reservoir is connected to the master cylinder 10. The latter is connected to the brake operating cylinders 9 of the diagonally opposite wheels 1 and 4, through pipes indicated 14 to 16. The master cylinder is also connected to the wheels 2 and 3, which are also diagonally opposite, through pipes indicated 17 to 19.

The braking system is therefore of the X kind.

An angular velocity sensor, indicated generally 20, is coupled to the rear wheel 4. This sensor comprises a toothed wheel 21 carried by the wheel 4 and a magnetic sensor 22 facing the wheel 21. In operation the sensor 22 supplies electrical signals indicative of the speed of rotation of the rear wheel 4 of the motor vehicle.

Reference numeral 30 indicates a first solenoid-operated changeover valve interposed in the pipe 16. This valve has an inlet 30a connected to the master cylinder 10 through the pipes 14 and 16, and two outlets 30b and 30c, the first of which is connected to the brake operating cylinder 9 of the wheel 4, while the second is connected to the exhaust. The latter is constituted by the hydraulic fluid reservoir 12.

A solenoid operated changeover valve 31, wholly analagous to the valve 30, is connected in the pipe 17 and has an inlet 31a connected to the master cylinder 10, and two outlets 31b and 31c connected respectively to the brake operating cylinders 9 of the wheels 2 and 3 and to the exhaust, represented by the reservoir 12.

Reference numeral 40 indicates an electronic control and command unit, which may, for example, employ a microprocessor, connected to the magnetic sensor 22 and to the electrical command input of each of the solenoid valves 30 and 31 described above. Each of these can assume substantially two operational states. In a first state (de-energised state) each of the said solenoid valves connects the respective inlet 30a, 31a, to the respective outlet 30b, 31b connected to the respective brake operating cylinder 9 of the wheel/wheels with which it is associated. When each of these solenoid valves receives an energising command signal from the control and command unit 40, communication between the respective inlets 30a, 31a and the brake operating cylinders 9 of the associated wheels is interrupted: these brake operating cylinders are connected to the exhaust, so as to reduce the intensity of the braking action applied to the respective wheels.

By using calibrated exhaust valves of a kind known per se, incorporated in the solenoid valves 30 and 31, or else connected (in a manner not shown) to the respective outlets 30c and 31c, it is possible to reduce the braking force applied to the wheels 3 and 4 to a predetermined value.

The control and command unit 40 is also connected to a wheel steering angle sensor 50. If the vehicle's steering gear is of the rack and pinion kind, the sensor 50 may consist of a magnetic sensor designed to record the movements of the rack. In this case the sensor 50 may consist of a magnetic sensor designed to record the movements of the rack. In this case the sensor 50 may be coupled to the steering box 51, as indicated diagrammatically in the drawing.

The electronic control and command unit 40 is further connected to the supply circuit 52 of the electric starter motor 53 of the internal combustion engine of the motor vehicle.

There is moreover connected to the unit 40 an electrical pressure sensor 54 inserted in the pipe 15.

Indicated 55 is a further speed sensor, mounted on the front differential 60 of the motor vehicle by means known per se, for supplying electrical signals indicative of the average speed of rotation of the front wheels 1, 2. This sensor is connected to the control and command unit 40.

Indicated at 56 is a sensor (for example of the phonic wheel kind) designed to supply electrical signals indicative of the speed of rotation (revolutions) of the engine of the motor vehicle. The sensor 56, is also connected to the control and command unit 40.

The hydraulic braking system may further include two braking correction mechanisms 70, 71 each fitted by conventional means in a respective diagonal of the braking system.

The anti-skid device described above operates in the following manner.

When the vehicle is travelling the control and command unit 40 receives data on the angular speed of the rear wheel 4 from the sensor 22 and of the steering angle of the wheels from the sensor 50. When the braking system is activated by acting on the pedal 11, the sensor 41 supplies a corresponding signal to the control unit 40. If, following braking, the rear wheel 4 (hereinafter referred to as the controlled wheel) tends to lock (that is, its angular deceleration exceeds a predetermined value) then the control and command unit 44 energises the solenoid valve 30, effecting partial de-braking of the rear wheel 4. This contributes to increasing the degree of lateral satbility of the motor vehicle. The solenoid valve 30 is kept energised until the sensor 41 signals to the control and command unit 40 that the brake pedal has been released.

If, after the sensor 22 has signalled to the control and command unit 40 an incipient locking condition of the rear wheel 4, the driver acts on the steering wheel to vary the steering angle by an amount greater than a predetermined value relative to the value of the said angle at the instant when the control and command unit 40 detected the incipient locking condition and the rear wheel 4 is still locked and if the average speed sensor 55 of the front wheels indicates that these are both locked, then the control and command unit 40 energises the solenoid valve 31, effecting at least a partial reduction of the braking force applied to the wheels 2 and 3; the solenoid valve 31 is de-energised as soon as the difference between the actual angle of steering and the angle of steering which existed at the moment of locking of the front wheels has decreased again to below the said predetermined value.

Energisation of the solenoid valves 30 and 31, under the conditions described above, drastically reduces the risks of a so-called "head-tail" occurring, and of steering control of the vehicle being lost.

For safety reasons, after a predetermined time interval, or a period from the moment of activation of the solenoid valve 31, the electronic control and command unit 40 in any case de-energises the same, even if the brake pedal 11 remains depressed.

In the event that, after energisation of the solenoid valve 31, the signal supplied by the sensor 55 should continue to indicate that the rear wheels remain locked (this can occur under conditions of poor tyre adhesion if the engine cuts out and the adhesion is insufficient to overcome the turning resistance of the dead engine) and if at the same time the sensor 56 signals that the engine is dead, the electronic control and command unit 40 energises the electric starter motor 53 so as to induce restarting of the dead engine and consequent rotation of the front wheels. Activation of the electric starter motor 53 is stopped as soon as the sensor 56 signals that the engine has begun to turn again.

The pressure sensor 54 is connected to an input for enabling operation of the electronic control and command unit 40: this unit is only activated if the pressure of hydraulic brake fluid recorded by the sensor 54 is greater than a predetermined minimum value.

The anti-skid device described above is of relatively simple construction, and comprises a modest number of components. Experimental tests carried out by the Applicant have confirmed the reliability of the device.

The reduction of the braking force applied to the rear wheel 3 situated on the same side as the controlled wheel 4 allows the lateral stability of the vehicle to be increased, while the reduction of the braking force applied to the other diagonal of the hydraulic system improves the steerability of the motor vehicle.

I claim:

1. An anti-skid device for a front-wheel drive motor vehicle with a front-mounted engine and fitted with a hydraulic braking system comprising a master cylinder actuated by a brake pedal and connected to a first and a second hydraulic circuit each connected to brake operating cylinders of a respective pair of diagonally opposed front and rear wheels of the motor vehicle, the said device comprising:

electrical position sensor means associated with the brake pedal;

sensor means for sensing the average speed of the front wheels;

angular speed sensor means designed to supply electrical signals indicative of the speed of rotation of at least one rear wheel of the motor vehicle;

sensor means for sensing the speed of rotation of the engine, an electrical sensor for sensing the steering angle of the wheels of the motor vehicle, a first and a second electrically-controlled changeover valve designed to be fitted respectively in the first and the second hydraulic circuits between the master cylinder and the brake operating cylinder of the rear wheel, each changeover valve being designed, when it receives a command signal, to changeover from a first condition in which it permits braking of at least one of said front and rear wheels with which it is respectively associated to a second condition in which it causes at least partial reduction of the braking force of at least one of said front and rear wheels with which it is associated; and an electronic control unit connected to the said angular speed sensor means, to said average speed sensor means, to said engine speed sensor means, to the position sensor means, to the said electrically controlled changeover valves and to the said steering sensor and arranged:
(a) to supply said command signal to the first changeover valve, during braking, to reduce the braking force of the said at least one rear wheel associated with the said first valve when the signals supplied by the said position sensor means and the said angular speed sensor means respectively indicate that the brake pedal is depressed and the said at least one rear wheel of the motor vehicle is on the point of locking; and
(b) to supply said command signal to the second changeover valve to reduce the braking force of the front and rear wheels associated with the said second valve when, during said braking, the signals supplied by the said average speed sensor means and the steering sensor means respectively indicate that at least one front wheel is locked and that the steering angle has increased beyond a predetermined extent relative to a value assumed by the said steering angle at the instant when the said at least one rear wheel locked.

2. An anti-skid device according to claim 1, wherein the said electronic control unit is predisposed to suspend application of the said command signal to the said second changeover valve after a predetermined time starting from the moment of emission of the said signal.

3. An anti-skid device according to claim 1, wherein the said control unit is connected to an electric starter motor of the engine of the motor vehicle and is predisposed to provide a command signal used to induce activation of the said starter motor when the signals supplied by the average speed sensor means and the engine rotational speed sensor means and the position sensor means indicate that, after the operation of the motor vehicle brakes, at least one front wheel of the motor vehicle has locked and that, after the application of said command signal to the said second electrically controlled changeover valve, at least one front wheel remains locked, so as to cause re-starting of at least one front wheel of the motor vehicle and consequent return to conditions of stability and driving control of same.

4. An anti-skid device according to claim 1, further including a first and a second braking correction device each fitted in said respective diagonal of the hydraulic braking system of the motor vehicle.

* * * * *